US007792832B2

(12) United States Patent
Poltorak

(10) Patent No.: US 7,792,832 B2
(45) Date of Patent: Sep. 7, 2010

(54) APPARATUS AND METHOD FOR IDENTIFYING POTENTIAL PATENT INFRINGEMENT

(76) Inventor: Alexander I. Poltorak, 128 W. Maple Ave., Monsey, NY (US) 10952

( * ) Notice: Subject to any disclaimer, the term of this patent is extended or adjusted under 35 U.S.C. 154(b) by 1648 days.

(21) Appl. No.: 10/760,738

(22) Filed: Jan. 20, 2004

(65) Prior Publication Data

US 2004/0158559 A1  Aug. 12, 2004

(51) Int. Cl.
G06F 17/30 (2006.01)
G06F 7/00 (2006.01)
(52) U.S. Cl. .................. 707/730; 707/780; 707/937
(58) Field of Classification Search ............ 707/730, 707/780, 937
See application file for complete search history.

(56) References Cited

U.S. PATENT DOCUMENTS

| 5,623,679 | A | * | 4/1997 | Rivette et al. | 715/526 |
|---|---|---|---|---|---|
| 5,623,681 | A | * | 4/1997 | Rivette et al. | 715/522 |
| 5,696,963 | A | * | 12/1997 | Ahn | 707/5 |
| 5,754,840 | A | * | 5/1998 | Rivette et al. | 707/2 |
| 5,799,325 | A | * | 8/1998 | Rivette et al. | 715/500 |
| 5,806,079 | A | * | 9/1998 | Rivette et al. | 715/512 |
| 5,809,318 | A | * | 9/1998 | Rivette et al. | 715/512 |
| 5,845,301 | A | * | 12/1998 | Rivette et al. | 715/512 |
| 5,848,409 | A | * | 12/1998 | Ahn | 707/3 |
| 5,982,931 | A | * | 11/1999 | Ishimaru | 382/218 |
| 5,991,751 | A | * | 11/1999 | Rivette et al. | 707/1 |
| 6,038,561 | A | * | 3/2000 | Snyder et al. | 707/6 |
| 6,189,002 | B1 | | 2/2001 | Roitblat | |
| 6,289,341 | B1 | * | 9/2001 | Barney | 707/6 |
| 6,339,767 | B1 | * | 1/2002 | Rivette et al. | 707/2 |
| 6,401,118 | B1 | * | 6/2002 | Thomas | 709/224 |
| 6,477,524 | B1 | | 11/2002 | Taskiran et al. | |
| 6,499,026 | B1 | * | 12/2002 | Rivette et al. | 707/2 |
| 6,546,390 | B1 | | 4/2003 | Pollack et al. | |
| 6,662,178 | B2 | * | 12/2003 | Lee | 707/3 |
| 6,665,656 | B1 | * | 12/2003 | Carter | 707/3 |
| 6,694,331 | B2 | * | 2/2004 | Lee | 707/104.1 |
| 6,879,990 | B1 | * | 4/2005 | Boyer et al. | 707/205 |
| 7,047,255 | B2 | * | 5/2006 | Imaichi et al. | 707/104.1 |
| 2001/0027452 | A1 | * | 10/2001 | Tropper | 707/3 |
| 2002/0077853 | A1 | * | 6/2002 | Boru et al. | 705/2 |
| 2002/0138465 | A1 | * | 9/2002 | Lee | 707/1 |
| 2002/0138474 | A1 | * | 9/2002 | Lee | 707/3 |
| 2002/0138475 | A1 | * | 9/2002 | Lee | 707/3 |
| 2002/0147738 | A1 | * | 10/2002 | Reader | 707/500 |

(Continued)

OTHER PUBLICATIONS

Buckman, J. "Data Mining for the Soft Assets", Manning & Napier Investor Relations, Dec. 1996.*

(Continued)

*Primary Examiner*—Luke S Wassum
(74) *Attorney, Agent, or Firm*—Anatoly S. Weiser, Esq.

(57) ABSTRACT

A computer system, method, and storage medium with embedded code automate search for products that potentially infringe patents or similar rights of exclusion. The computer system receives an identifier of the patent, retrieves the patent's text, parses the text to identify contextually important terms of a claim, and then formulates queries that include these key terms. The system launches the queries and receives search results. If the number of results is excessive, the queries are reformulated more restrictively. The system determines contextual relevance of the results and arranges the results in order of their relevance.

48 Claims, 2 Drawing Sheets

U.S. PATENT DOCUMENTS

| | | | |
|---|---|---|---|
| 2003/0046307 A1* | 3/2003 | Rivette et al. | 707/104.1 |
| 2003/0065774 A1* | 4/2003 | Steiner et al. | 709/225 |
| 2003/0187832 A1* | 10/2003 | Reader | 707/3 |
| 2004/0015481 A1* | 1/2004 | Zinda | 707/1 |
| 2004/0078192 A1* | 4/2004 | Poltorak | 704/9 |
| 2004/0133562 A1* | 7/2004 | Toong et al. | 707/3 |
| 2004/0158559 A1* | 8/2004 | Poltorak | 707/3 |
| 2004/0243566 A1* | 12/2004 | Ogram | 707/3 |
| 2004/0261011 A1* | 12/2004 | Stuckman et al. | 715/507 |
| 2005/0071367 A1* | 3/2005 | He et al. | 707/102 |
| 2005/0119995 A1* | 6/2005 | Lee | 707/3 |
| 2006/0026146 A1* | 2/2006 | Tvito | 707/3 |

OTHER PUBLICATIONS

Calistri-Yeh, R. and B. Yuan "The MAPIT Patent-TSV System", Advanced Technology Group, Manning & Napier Information Services, Version 2.7, Jan. 11, 2000.*

Feldman, S. "Manning & Napier Information Services Announces Cindor, a Multi-Language Search-and-Retrieval System", Information Today, vol. 17, No. 2, p. 42, Feb. 2000.*

Poltorak, A.I. and P.J. Lerner "Introducing Litigation Risk Analysis", Managing Intellectual Property, Issue 109, May 2001.*

PR Newswire "Aurigin and ClearForest Partner to Significantly Increase Search and Analysis Capabilities for Critical Patent Research", press release, Oct. 15, 2001.*

ClearForest Corp. "ClearForest Announces ClearTags 4.0 for Comprehensive Content Auto-Tagging", press release, Mar. 5, 2002.*

ArnoldIT "ClearForest: Cutting through Content Clutter", downloaded from www.arnoldit.com/articles/clearforest.pdf, Sep. 7, 2003.*

Robb, D. "Text Mining Tools take on Unstructured Data", Computerworld, Jun. 21, 2004.*

Lau, K-N, K-H Lee, Y. Ho and P-Y Lan "Mining the Web for Business Intelligence: Homepage Analysis in the Internet Era", Database Marketing & Customer Strategy Management, vol. 12, No. 1, pp. 32-54, Apr. 19, 2004.*

Poltorak, A.I. "Industrywide Patent Enforcement Strategies", Law Journal Newsletters, Patent Strategy & Management, Oct. 2005 and Nov. 2005 (Pts I & II).*

Ben-Dov, M., W. Wu, R. Feldman and P.A. Cairns "Improving Knowledge Discovery by Combining Text-Mining and Link-Analysis Analysis Techniques", undated, downloaded from www.uclic.ucl.ac.uk/paul/research/Moty1.pdf, Jun. 14, 2006.*

BusinessWire "Manning & Napier Information Services -MNIS- Releases New Version of Leading Patent Search and Analysis Tool", press release, Aug. 26, 1999.*

* cited by examiner

APPARATUS AND METHOD FOR IDENTIFYING POTENTIAL PATENT INFRINGEMENT

REFERENCE TO RELATED APPLICATIONS

This application claims priority benefit of provisional U.S. patent application Ser. No. 60/419,184, entitled APPARATUS AND METHOD FOR IDENTIFYING AND/OR FOR ANALYZING POTENTIAL PATENT INFRINGEMENT, filed 17 Oct. 2002; and of U.S. patent application Ser. No. 10/665,237, identically entitled, which applications are hereby incorporated by reference.

FIELD OF THE INVENTION

The present invention relates generally to search engines, and, more particularly, to computer-based apparatus and computer-assisted methods for identifying potential patent infringement.

BACKGROUND

Patents and similar rights of exclusion (collectively referred to as "patents" hereinafter) often have to be enforced to maximize their value, or even to obtain from them any value at all. But before any enforcement steps can be taken, the patent owner needs to identify potentially infringing goods, services, or processes. (Goods, services, and processes will be collectively referred to as "products" hereinafter.) To identify the potentially infringing products, the owner needs to ascertain, or at least guess, the meaning of the claim elements, and to compare the universe of existing products to the elements of the claims. This can involve a great deal of effort and expense on the part of the patent owner.

A need thus exists for apparatus and methods that can automate the process of identifying potentially infringing products.

SUMMARY

The present invention is directed to apparatus, methods, and articles of manufacture that satisfy these needs. The invention herein disclosed includes a method for identifying products potentially infringing a patent. In accordance with this method, a computer-based system receives an identifier of the patent and uses the identifier to retrieve the patent's text. The system parses and analyzes the text to identify the claims section of the patent, the individual claims of the patent, and one or more independent claims of the patent. A claim, for example, an independent claim, is parsed to identify the preamble of the claim and one or more limitations of the claim. The system then parses the limitations and the preamble to identify the key terms of the independent claim. To do so, stop words, i.e., words that contribute mainly to the grammatical structure rather than substantive meaning, are ignored. The remaining words can be contextually scored, and a predetermined criteria can be applied to decide which words are key terms. The system also identifies synonyms of the key terms. Both the key terms and the synonyms can be translated into foreign languages.

After the system decides on the key terms and their synonyms, it formulates at least one query to search for data items that include the key terms and the synonyms, and launches the query or queries. Internet search engines can be used for this purpose to search the Internet. Additionally, commercially available databases and other information sources can be searched.

The system receives the search results and compares their number against a predetermined maximum number of search results. If the search has resulted in an excessive number of search results, the system reformulates the query or queries more restrictively and launches the reformulated queries.

When the number of results is within the predetermined maximum number, the system contextually orders the results, to allow a person reviewing the results to focus on the more likely infringing products.

These and other features and aspects of the present invention will be better understood with reference to the following description, drawings, and appended claims.

DETAILED DESCRIPTION

Figure 1:
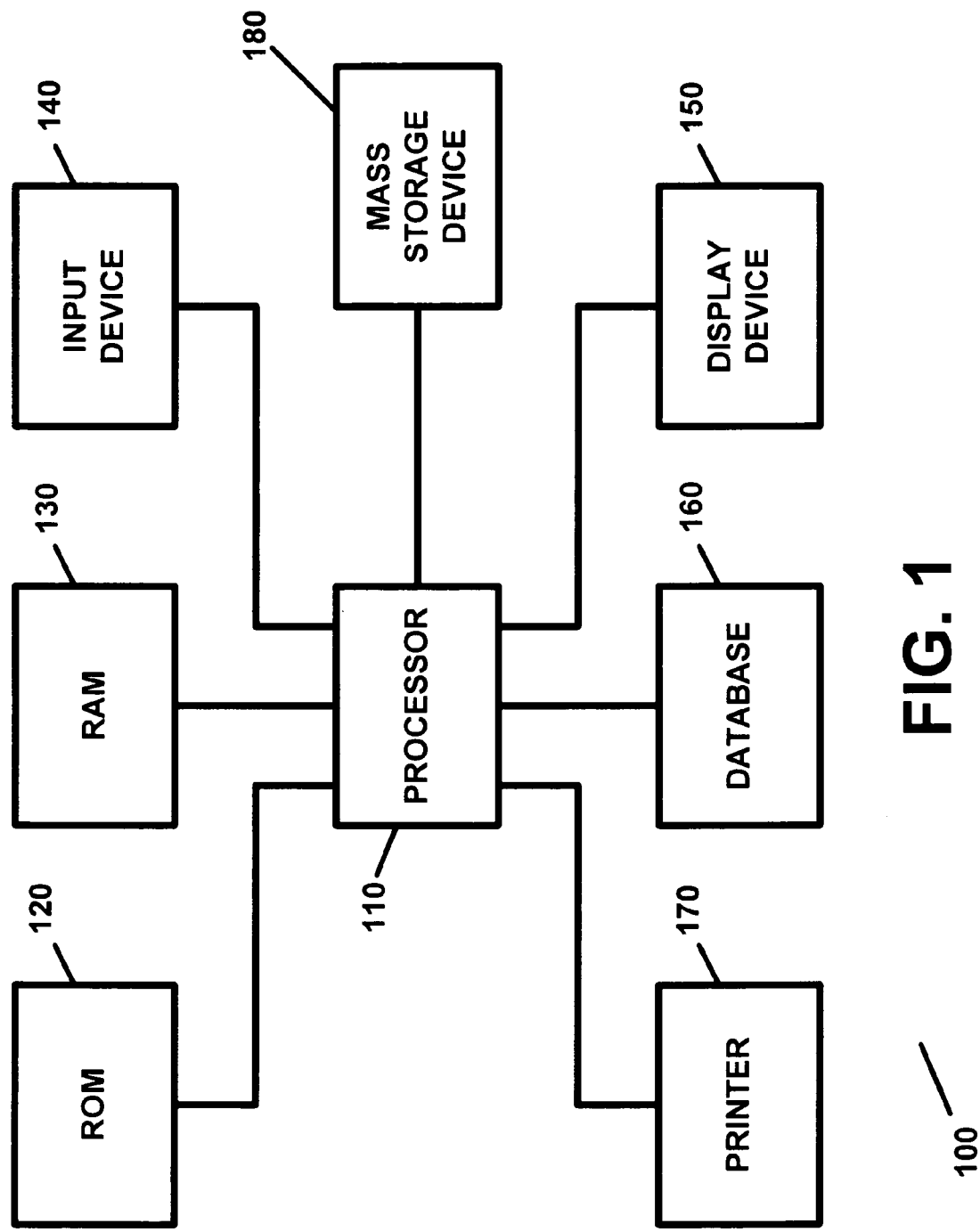
FIG. 1 is a simplified block diagram representation of a system for performing steps of a process for identifying products that potentially infringe a patent, in accordance with the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form, not to scale, and omit many apparatus elements and method steps that can be added to the described systems and methods.

Referring more particularly to the drawings, FIG. 1 is a simplified block diagram representation of a computer-based system 100 in accordance with the present invention. The figure does not show many of the system's hardware and software modules, and omits several physical and logical connections. The system 100 can be implemented as a special purpose data processor, a general-purpose computer, a computer system, or a group of networked computers or computer systems configured to perform the steps of the methods in accordance with the present invention, to generate information identifying possible patent infringement. In one embodiment, the system 100 is built on a personal computer platform, such as a Wintel PC or a Mac computer. The personal computer can be a desktop or a notebook computer. In another embodiment, the system 100 is implemented on a computer network within a client/server environment. In various versions of the network-based embodiment, the system 100 is implemented on the Internet, an intranet, or an extranet.

The system 100 executes instructions causing it to perform the steps of the methods described below, receiving inputs and generating results as described. The instructions may take the form of program code embodied in machine-readable storage media, such as hard drives, floppy diskettes, CD-ROMS, or DVDs. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other type of public or private network.

With reference to FIG. 1, the system 100 includes a processor 110 that can perform the processing routines and control functions of the methods in accordance with the invention. The system 100 also includes memory arrays 120 and 130, and a mass storage device 180. In the illustrated embodiment, the memory array 120 is a read only memory (ROM) device, the memory array 130 is a random access memory (RAM) device, and the mass storage device 180 is a magnetic disk drive. The mass storage device 180 and each of the memory arrays 120 and 130 are connected to the processor 110 to allow the processor 110 to write into and read from these storage and memory devices.

A user input device 140 is used to enter data or commands into the system 100. The input device 140 can include one or more of the following mechanisms: a keyboard; a scanner; a user pointing device, for example, a mouse, a trackball, or a touch pad.

The system 100 further includes one or more output devices, for example, a display 150 and a printer 170. The output devices provide to the user information, such as uniform resource locator (URL) links to descriptions of potentially infringing products. As illustrated in FIG. 1, the user input device 140 and the output devices 150 and 170 are coupled to the processor 110. The processor, however, need not be placed proximate to the I/O devices 140, 150, and 170. In one embodiment of the system 100, the I/O devices 140/150/170 are placed in a different physical location than the processor 110, and the connection between these I/O devices and the processor 110 is maintained over a network. The network connection between the I/O devices 140/150/170 and the processor 110 can be a local area network (LAN), a wide area network (WAN), a wired or wireless network, the Internet, an intranet, or an extranet.

The system 100 also includes a database 160 for storing the data that may be needed or desired in performing the method steps described in this document. The database can be a physically separate system coupled to the processor 110 by a dedicated connection or over a network, as illustrated in FIG. 1. In one alternative variant of the system 100, the processor 110 and the mass storage device 180 perform the functions of the database 160.

Figure 2:
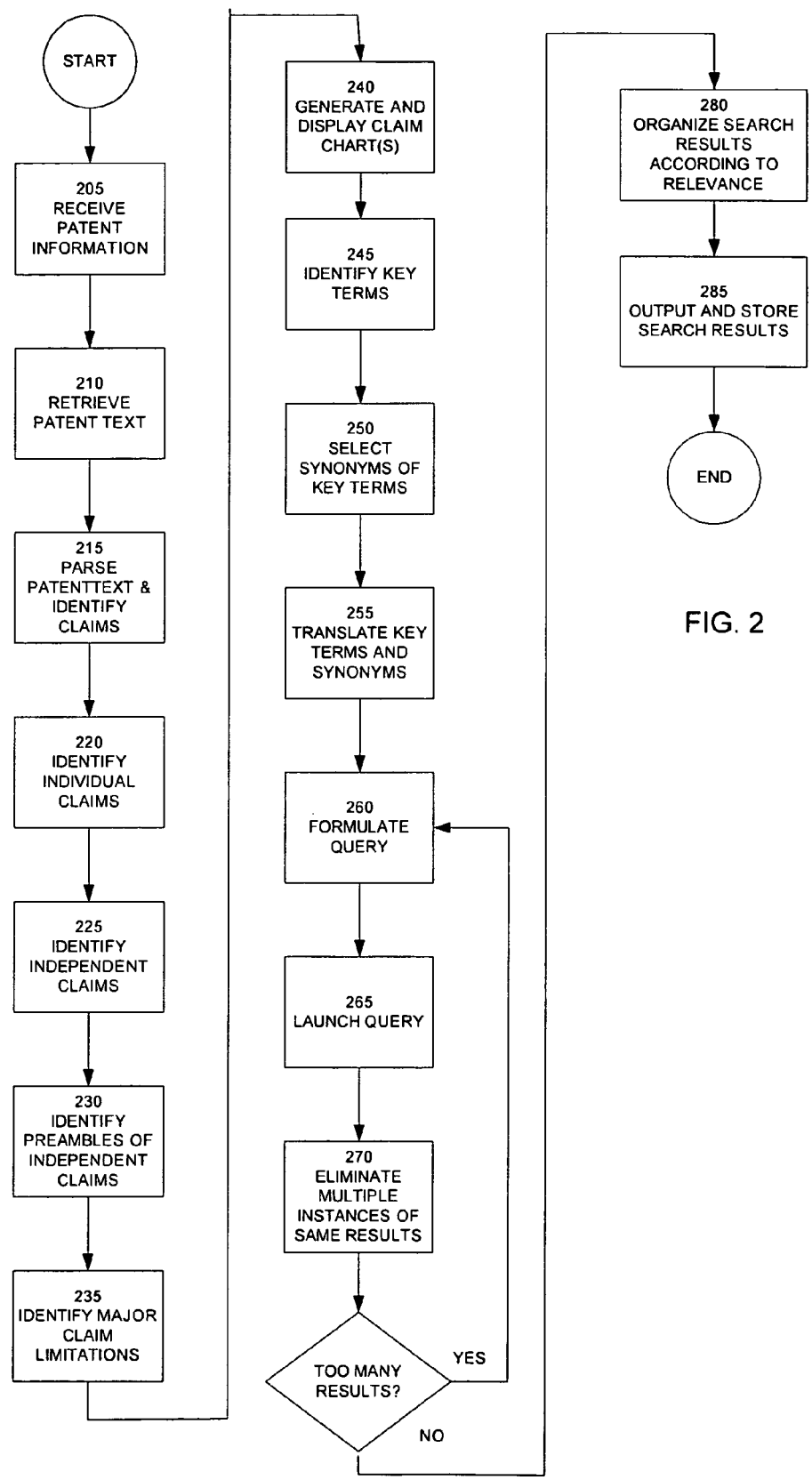
FIG. 2 is a high-level flowchart of a process in accordance with the present invention for identifying products that potentially infringe a patent.

FIG. 2 illustrates a flowchart 200 of a process in accordance with the present invention, performed by the computer system 100. Starting with step 205, the system 100 receives information about the patent to be analyzed for potential infringement. The information can be the full text of the patent or the text of the patent's claims. In the process of FIG. 200, however, the information is the patent number or another identifier of the patent. At step 210, the system 100 makes contact with a database containing the analyzed patent and, using the patent's identifier, retrieves the patent's text and, optionally, the patent's drawings.

Once the text is retrieved, it is parsed, at step 215, to identify the text of the patent's claims. Given the structure of patent documents, the claims can be identified from their location within the body of the patent. In the U.S. PTO database, for example, the claims follow the entries for title, abstract, bibliographic information, references cited, and cross-reference to related applications. The word "claims" and the expressions such as "I claim," "We claim," and "What is claimed is" can also be used to help in identifying the beginning of the claims section. The end of the claims section can be identified in a similar manner, for example, by the word "description" or other words and expressions that typically follow the claims, such as "background" and "field of the invention." Additionally, claim identification can be reinforced by using the numbering of the claims, and a large number of semicolons among the claims' punctuation marks.

At step 220, each claim from the claims section is identified. This can be achieved, for example, by looking at the claim numbers and the periods at the end of each claim. Next, the system 100 identifies independent claims, at step 225. Independent claims are distinguished from dependent claims in that they do not contain references to other claims, i.e., they do not include such phrases as "The apparatus of claim N," "An apparatus in accordance with claim N," "The method of claim N," and "The XYZ as in claim N."

At step 230, the preambles of the independent claims are identified. Preambles stand out—and can be distinguished by—the initial colon of the independent claim and transitional phrases, such as "comprising," "having," "including," "consisting," "which comprises," and "characterized."

At step 235, the system 100 further breaks each independent claim into major constituent limitations. One way to do this is by using punctuation of the claim, for example, by using the semicolons as separators/delimiters of the major limitations in a claim. Additionally, carriage return characters and paragraph numbering headings, either alone or in conjunction with the punctuation marks, can be used to identify the major claim limitations. If dependent claims will be analyzed, they can be broken down into their major limitations in the same step.

A claim chart data structure is generated and displayed to the operator for each claim in step 240. A claim's chart includes the claim's text delimited to separate the claim's preamble and major limitations. Note that the entries for a dependent claim (if dependent claims are present and analyzed) include all of the entries for the claim or claims from which the dependent claim depends, as well as the entries generated from the limitations specific to the dependent claim itself. The claim charts are displayed to the operator of the system 100 in table format. The operator may choose to correct the delimitations of the claims, or indicate that the claims have been correctly delimited.

At step 245, the system 100 identifies key terms of the preamble and the major limitations. In doing so, the system 100 can use contextual analysis using the entire patent text as the context. To identify the key words of the preamble or a limitation, the system first converts the preamble or the limitation, as the case may be, into a string of words. Stop or "chaff" words, i.e., words that provide structure but not substance, are removed. Such words include "a," "an," "is," "this," "being," "rather," "some," "to," "have," "comprising" and similar common words, as well as boilerplate words commonly used in patent claims. Then the system 100 removes inflections from the remaining words. For example, gerunds are converted into verb infinitives. In one process in accordance with the present invention, the remaining words are considered key terms. In another process in accordance with the present invention, the remaining words are compared with the text of the entire patent and to a neutral text, i.e., a large text unrelated to the patent and to the technology of the patent. For each word, the frequency of occurrence of the word in the patent and the frequency of occurrence of the word in the neutral reference text are computed, as well as the ratio of the two frequencies. The higher the ratio of the frequencies for a word, the more likely it is that the word is related to an element of a potentially infringing product and should be considered a "key term," that is, be included in a search for infringing products. In one embodiment, for example, every word having the ratio of the two frequencies of occurrence higher than a predetermined parameter, such as 1, is considered a key term.

After identifying the key terms, the system 100 determines synonyms of the key terms and words and expressions that are similar to the key terms, at step 250. Hereinafter, I will refer to synonyms and similar words collectively as "synonyms."

The synonyms can be determined, for example, by looking up the key terms in a general language dictionary, a thesaurus, or a specialized technical dictionary.

At step 255, the system 100 translates the key terms and their synonyms into additional languages. For example, if the patent text is written in English, the system translates the key terms into languages of non-English-speaking industrialized nations, such as German and French.

At step 260, the system 100 formulates one or more queries. It should be noted that here equivalent queries in all languages should be considered as a single query. By one or more queries I mean one or more non-equivalent queries. The queries can be formulated simultaneously, or additional queries can be formulated after obtaining results of the searches responsive to previously launched queries. Furthermore, queries can be formulated for several claims of the patent. In one variation of the method of FIG. 2, at least one query is formulated for each claim of the patent. In another variation, at least one query is formulated for each independent claim of the patent.

One example of a formulated query is a Boolean query requiring the presence of at least one of the key terms or synonyms for the preamble and for each key limitation. Thus, if the preamble has key terms and synonyms $PR_1, \ldots PR_i$, a first key limitation has key terms and synonyms $L1_1, \ldots L1_n$, a second key limitation has key terms and synonyms $L2_1, \ldots L2_m$, and there are no other key limitations, the query might look like this: $[(PR_1, \text{ or } PR_2 \text{ or } \ldots PR_i) \text{ and } (L1_1 \text{ or } L1_2 \text{ or } \ldots L1_n) \text{ and } (L2_1 \text{ or } L2_2 \text{ or } \ldots L2_m)]$.

Many other queries are useful as well. In one exemplary process in accordance with the present invention, weights are assigned to individual key limitations and to the preamble. Then, a query is formulated to bring results having some minimum total weight. In this query scheme, lower weight key limitations may be absent from a search result if higher weight limitations are present in the result. The weight assignments can be contextual, as described above, and based on the context of the full text, abstract, summary, or detailed description of the patent. In a variation of this process, the weights are assigned contextually based on the full text of a sample of patents with the same classification as the analyzed patent. For example, all patents that issued during the same year as the analyzed patent and having the same classification can provide the background (i.e., reference) text for the weight assignments. Recall that the weights can be assigned based on the frequencies of occurrence of a given word in the reference text and in a neutral text.

In yet another process in accordance with the present invention, a search query is formulated so that its results will contain at least a predetermined percentage of the key terms, for example, 60, 70, 80, or 90 percent of the key terms. This scheme can be employed when at least a predetermined number of key terms—ten, for example—is present in the chart of the claim. In still another process in accordance with the present invention, the formulated query can require that all key terms of the preamble be present in each search result, but that only a predefined percentage of the key terms of the limitations be present in each result.

The one or more queries are launched in step 265. In the described embodiment, each query is launched in parallel, using multiple threads and search engines. The foreign language queries are also launched in parallel at the same time. The search engines include several web-based search engines, such as those provided by YAHOO!, Altavista, Web Ferret, and Google. The system 100 further executes searches on commercial databases accessible to it, such as Dialog databases; NERAK databases; Thomas Register databases; Derwent databases; goods and services catalog databases; industry atlas databases; trade, industry, and technical journal databases; product manual compilation databases; and databases of books, magazines, and other publications. For databases that do not require Boolean queries, the queries can be reformulated using, for example, natural language.

In one process in accordance with the present invention, a database storing a compilation of articles published in periodicals from the industry related to the analyzed patent is implemented as part of the database 160. At least some of the queries are launched against this stand-alone database. In another process in accordance with the present invention, the queries are launched using only external search engines. In yet another process in accordance with the present invention, the queries are launched against both stand-alone databases and using external search engines. One source of particular interest is likely to be a compilation of reviews of new products from publications of the industry to which the analyzed patent relates.

Chat rooms and bulletin boards are another source of useful information for posting the queries. For this source, the queries are generally formulated in natural language. For example, the system 100 can translate a Boolean query into a natural language query, transmit the query to chat rooms and on-line bulletin boards, and then receive and process any responses to the query. The natural language query can take the form of a message such as this one: "Does anyone know of a [product/service] that has these features . . . ?"

At step 270, the system 100 examines the results of the multiple searches and eliminates multiple instances of same or similar results. For example, multiple instances of a certain web page can be reduced to a single result. The system 100 then notifies its operator of the total number of distinct search results, and allows the operator to choose whether to proceed or to go back to one of the previous steps, in order to change the search criteria, so that more or fewer search results are obtained. The last step, denominated with numeral 275, can be automated. For example, a predetermined acceptable number of results may be set prior to performing the searches. If the number of results exceeds the limit, the query is modified to narrow the search criteria. In order to narrow the search criteria, more key terms may be included in the query, date restrictions can be added, certain synonyms can be excluded from the disjunctive terms of a Boolean query, and equivalent queries in foreign languages can be eliminated. Also, the number of queries can be reduced. There are of course other logical ways to narrow the search criteria or otherwise reduce the number of results.

The process of modifying the query and counting the results is performed until the number of results is within the limit imposed on the number of search results.

Next, at step 280, the system 100 organizes the search results in order of decreasing contextual relevance. The contextual relevance criteria that can be used for this purpose has been described above, in relation to the steps of determining key terms of the preamble and the limitations, and assigning weights to the key terms. Here, the same reference text can be used to determine relevancy of the search results. Alternatively, a different text can be used to provide the context. In a process in accordance with the present invention, the reference text used is a collection of scientific and engineering articles relating to the technological field of the patent. The articles are stored in the database 160 of the system 100.

There are many other methods for performing contextual searches and assigning relevancy scores based on context. For examples, an interested reader is referred to U.S. Pat. No.

6,477,524; U.S. Pat. No. 6,546,390; and U.S. Pat. No. 6,189,002. These patents are hereby incorporated by reference.

In step 285, the ordered results are presented to the operator of the system 100 as output of the search for potentially infringing products. The results can be presented as hypertext links, as addresses of websites, or as indications of where each particular result exists within the body of the database or of another source from where the result originates. In one process in accordance with the present invention, each result is presented to the operator together with a modified claim chart of the claim that was used to generate the query or queries, with the key terms or their synonyms that are found within the result being underlined, emboldened, or otherwise distinguished to bring them to the operator's attention. The ordered results (and any intermediate results) can also be stored for future reference, or sent to another person or computer over a network, in addition to or instead of being displayed to the operator.

In a variation of this process, the web pages or similar information-containing data structures referenced by the results are downloaded, either partially or in their entirety, and cached by the system 100 to enable the operator to view the pages at the time the operator examines the search results. In this manner, the operator can access the information even if the page containing the information has changed since the result was generated. Moreover, the results can be made available to the operator immediately, or practically immediately, even of the computer that serves the information is temporarily off-line, or is slow to respond for any other reason. In a refinement of this technique, only those information-containing data structures that correspond to search results with some threshold relevance are cached, thus reducing the total storage space and bandwidth needed for local caching. The cached results can later be used as evidence in enforcement proceedings.

Steps 245-285 can be repeated for other claims of the analyzed patent, both independent and dependent.

Finally, the results of the search or multiple searches for each claim are evaluated by a person, to determine whether each result corresponds to a product and whether the product is likely to infringe the analyzed patent.

This document describes the inventive methods, apparatus, and articles of manufacture in considerable detail for illustration purposes only. Neither the specific embodiments and methods of the invention as a whole, nor those of its features limit the general principles underlying the invention. The specific features described herein may be used in some embodiments, but not in others, without departure from the spirit and scope of the invention as set forth. Furthermore, "couple," "connect," and similar expressions with their variants do not necessarily import an immediate or direct connection, but include connections through intermediate elements within their meaning. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function has been vested in the claims and their equivalents.

I claim:

1. A method for identifying products potentially infringing a patent, the method comprising:

determining frequencies of occurrence within the text of the patent of each word of a plurality of words in a claim of the patent to obtain a plurality of first frequencies;

determining frequencies of occurrence of said each word in a neutral text unrelated to the patent and to technology of the patent to obtain a plurality of second frequencies;

for said each word, calculating a ratio of the first frequency associated with said each word to the second frequency associated with said each word, thereby obtaining a plurality of ratios, a ratio of the plurality of ratios per said each word;

comparing each ratio of the plurality of ratios to a first parameter to obtain a plurality of key terms, each key term of the plurality of key terms comprising a word corresponding to a ratio of the plurality of ratios that exceeds the first parameter;

formulating at least one query to search for data items that include the key terms;

launching the at least one query;

receiving search results responsive to the at least one query; and organizing the search results according to a criterion of relevance to the patent, thereby obtaining organized search results; and outputting the organized search results.

2. The method of claim 1, further comprising:

determining a number of distinct search results;

comparing the number of distinct search results to a limit of quantity of search results; and repeating the steps of formulating at least one query, launching the at least one query, and receiving search results before the step of organizing if the number of distinct search results exceeds the limit of quantity of search results.

3. The method of claim 1, wherein the first claim is an independent claim.

4. The method of claim 1, further comprising the step of storing the search results.

5. The method of claim 1, further comprising:

removing common stop words that provide structure but not substance; and removing boilerplate words commonly used in patent claims;

wherein the steps of removing are performed before the steps of determining frequencies of occurrence.

6. A method for identifying products potentially infringing a patent, the method comprising:

receiving an identifier of the patent;

retrieving text of the patent;

parsing the text of the patent to identify claims section of the text of the patent;

parsing the claims section to identify one or more individual claims of the patent;

parsing the individual claims of the patent to identify one or more independent claims of the patent, the one or more independent claims comprising a first independent claim;

identifying a preamble of the first independent claim;

identifying one or more limitations of the first independent claim;

identifying one or more key terms for each limitation of the one or more limitations and for the preamble of the first independent claim;

formulating at least one query to search for data items that include the key terms of the one or more limitations of the first independent claim;

launching the at least one query;

receiving search results responsive to the at least one query; and reviewing the search results of the at least one query;

wherein the step of identifying one or more key terms comprises:

for each word of a plurality of words in the limitations, calculating a ratio of (1) frequency of occurrence within the text of the patent of said each word to (2) frequency of occurrence of said each word in a neutral text not related to the patent or to technology of the patent, thereby obtaining a plurality of ratios, each ratio of the plurality of ratios corresponding to a different said each word;

comparing each ratio of the plurality of ratios to a first predetermined parameter to obtain a plurality of key terms, a key term being a word of the plurality of words corresponding to a ratio of the plurality of ratios that exceeds the first predetermined parameter.

7. The method of claim 6, further comprising the step of organizing the search results according to a criterion of relevance to the patent.

8. The method of claim 6, further comprising the step of generating a claim chart after the step of identifying one or more key terms.

9. The method of claim 6, further comprising the step of selecting synonyms of the key terms, wherein the step of formulating at least one query comprises the step of formulating a first query to search for data items that include the key terms of the one or more limitations of the first independent claim and the synonyms of the key terms.

10. The method of claim 6, further comprising:

selecting synonyms of the key terms; and translating the key terms and the synonyms from language of the patent into a first foreign language, to obtain translated key terms in the first foreign language;

wherein the step of formulating at least one query comprises the step of formulating a first query in the language of the patent to search for data items that include the key terms of the one or more limitations of the first independent claim and the synonyms of the key terms, and the step of formulating a second query in the first foreign language to search for data items that include the key terms of the one or more limitations of the first independent claim and the synonyms of the key terms in the first foreign language, the second query being equivalent to the first query.

11. The method of claim 10, wherein the step of formulating at least one query comprises the step of formulating a plurality of queries.

12. The method of claim 11, further comprising the step of organizing the search results according to a criterion of relevance to the patent.

13. The method of claim 11, wherein the step of launching the at least one query comprises the step of parallel launching of the plurality of queries.

14. The method of claim 10 further comprising:

determining a number of distinct search results;

comparing the number of distinct search results to a limit of quantity of search results before the step of reviewing results; and repeating the steps of formulating at least one query, launching the at least one query, and receiving search results before the step of reviewing the search results if the number of distinct search results exceeds the limit of quantity of search results.

15. The method of claim 14, further comprising the step of organizing the search results according to a criterion of relevance to the patent.

16. The method of claim 6, further comprising the step of eliminating multiple instances of same search result after receiving the search results.

17. The method of claim 6, wherein the step of formulating at least one query comprises the step of formulating a plurality of queries.

18. A system for identifying products potentially infringing a patent, the system comprising:

a processor;

an input device coupled to the processor, the input device being capable of providing information to the processor; and an output device coupled to the processor;

wherein the processor is configured to receive through the input device data sufficient to obtain text of the patent;

obtain the text of the patent;

identify a plurality of key terms of a first claim of the patent by performing steps comprising:

determining frequencies of occurrence within the text of the patent of each word of a plurality of words in a claim of the patent to obtain a plurality of first frequencies, determining frequencies of occurrence of said each word in a neutral text unrelated to the patent and to technology of the patent to obtain a plurality of second frequencies, for said each word, calculating a ratio of (1) the first frequency of the plurality of first frequencies associated with said each word to (2) the second frequency of the plurality of second frequencies associated with said each word, thereby obtaining a plurality of ratios, a ratio of the plurality of ratios per said each word, and comparing each ratio of the plurality of ratios to a first parameter to obtain a plurality of key terms, each key term of the plurality of key terms corresponding to a ratio of the plurality of ratios that exceeds the first parameter;

formulate at least one query to search for data items that include the key terms;

launch the at least one query;

receive search results responsive to the at least one query; and organize the search results according to a criterion of relevance to the patent.

19. The system of claim 18, wherein:

the processor is further configured to determine number of distinct search results;

the processor is further configured to compare the number of distinct search results to a limit of quantity of search results; and the processor is further configured to formulate a second query, launch the second query, and receive search results responsive to the second query before organizing the search results if the number of distinct search results responsive to the at least one query exceeds the limit of quantity of search results.

20. The system of claim 18, wherein:

the output device is a display; and the processor is further configured to cause the display to display the search results.

21. The system of claim 18, further comprising a storage device, wherein the processor is further configured to cause the storage device to store the search results.

22. A system for identifying products potentially infringing a patent, the system comprising:
- a processor;
- a memory storing code;
- an input device coupled to the processor, the input device being capable of providing information to the processor; and
- an output device coupled to the processor;

wherein:
the processor under control of the code is configured to perform steps comprising:
- receiving an identifier of the patent;
- retrieving text of the patent;
- parsing the text of the patent to identify a claims section;
- parsing the claims section to identify one or more individual claims of the patent;
- parsing the individual claims of the patent to identify one or more independent claims of the patent, the one or more independent claims comprising a first independent claim;
- identifying a preamble of the first independent claim;
- identifying one or more limitations of the first independent claim;
- for each word of a plurality of words in the limitations, calculating a ratio of (1) frequency of occurrence within the text of the patent of said each word to (2) frequency of occurrence of said each word in a neutral text not related to the patent or to technology of the patent, thereby obtaining a plurality of ratios, each ratio of the plurality of ratios corresponding to a different said each word;
- comparing each ratio of the plurality of ratios to a first predetermined parameter to obtain a plurality of key terms, a key term being a word of the plurality of words corresponding to a ratio of the plurality of ratios that exceeds the first predetermined parameter;
- formulating at least one query to search for data items that include the key terms of the one or more limitations of the first independent claim;
- launching the at least one query; and
- receiving search results responsive to the at least one query.

23. The system of claim 22, wherein the processor is further configured to organize the search results according to a criterion of relevance to the patent.

24. The system of claim 22, wherein the processor is further configured to generate a claim chart.

25. The system of claim 22, wherein the processor is further configured to
- select synonyms of the key terms; and
- in the course of formulating the at least one query, formulate a first query to search for data items that include the key terms of the one or more limitations of the first independent claim and the synonyms of the key terms.

26. The system of claim 22, wherein the processor is further configured to
- select synonyms of the key terms;
- translate the key terms and the synonyms from language of the patent into a first foreign language, to obtain translated key terms and synonyms in the first foreign language;
- in the course of formulating the at least one query, formulate a first query in the language of the patent to search for data items that include the key terms or synonyms; and
- in the course of formulating the at least one query, formulate a second query in the first foreign language to search for data items that include the key terms or synonyms of the one or more limitations of the first independent claim in the first foreign language, the second query being equivalent to the first query.

27. The system of claim 26, wherein the processor is further configured to formulate a plurality of non-equivalent queries in the course of formulating the at least one query.

28. The system of claim 27, wherein the processor is further configured to organize the search results according to a criterion of relevance to the patent.

29. The system of claim 27, wherein the processor is further configured to launch the plurality of non-equivalent queries in parallel.

30. The system of claim 26, wherein the processor is further configured to
- determine number of distinct search results;
- compare the number of distinct search results to a limit of quantity of search results; and
- if the number of distinct search results exceeds the limit of quantity of search results, formulate at least a second query, launch the second query, and receive search results responsive to the second query.

31. The system of claim 30, wherein the processor is further configured to organize the search results according to a criterion of relevance to the patent.

32. The system of claim 22, wherein the processor is further configured to eliminate multiple instances of same search result after receiving the search results.

33. The system of claim 22, wherein the processor is further configured to formulate a plurality of queries in the course of formulating the at least one query.

34. An article of manufacture comprising a machine-readable storage medium with instruction code stored in the medium, said instruction code, when executed by a data processing system comprising a processor, causes the processor to perform the following steps to identify products potentially infringing a patent:
- determining frequencies of occurrence within the text of the patent of each word of a plurality of words in a claim of the patent to obtain a plurality of first frequencies;
- determining frequencies of occurrence of said each word in a neutral text unrelated to the patent and to technology of the patent to obtain a plurality of second frequencies;
- for said each word, calculating a ratio of the first frequency associated with said each word to the second frequency associated with said each word, thereby obtaining a plurality of ratios, a ratio of the plurality of ratios per said each word;
- comparing each ratio of the plurality of ratios to a first parameter to obtain a plurality of key terms, each key term of the plurality of key terms comprising a word corresponding to a ratio of the plurality of ratios that exceeds the first parameter;
- formulating at least one query to search for data items that include the key terms;
- launching the at least one query;
- receiving search results responsive to the at least one query; and
- organizing the search results according to a criterion of relevance to the patent.

35. The article of manufacture of claim 34, wherein the code further causes the processor to perform the steps of:
- determining a number of distinct search results;
- comparing the number of distinct search results to a limit of quantity of search results; and
- repeating the steps of formulating at least one query, launching the at least one query, and receiving search results before the step of organizing if the number of distinct search results exceeds the limit of quantity of search results.

36. The article of manufacture of claim 34, wherein the code further causes the processor to perform the step of storing the search results.

37. An article of manufacture comprising a machine-readable storage medium with instruction code stored in the medium, said instruction code, when executed by a data processing system comprising a processor, causes the processor to perform the following steps to identify products potentially infringing a patent:

receiving an identifier of the patent;
   retrieving text of the patent;
   parsing the text of the patent to identify claims section of the text of the patent;
   parsing the claims section to identify one or more individual claims of the patent;
   parsing the individual claims of the patent to identify one or more independent claims of the patent, the one or more independent claims comprising a first independent claim;
   identifying a preamble of the first independent claim;
   identifying one or more limitations of the first independent claim;
   identifying one or more key terms for each limitation of the one or more limitations;
   formulating at least one query to search for data items that include the key terms of the one or more limitations of the first independent claim;
   launching the at least one query;
   receiving search results responsive to the at least one query; and
   reviewing the search results of the query;
   wherein the code causes the processor, in the course of performing the step of identifying one or more key terms, to perform steps comprising:
   for each word of a plurality of words in the one or more limitations, calculating a ratio of (1) frequency of occurrence within the text of the patent of said each word to (2) frequency of occurrence of said each word in a neutral text not related to the patent or to technology of the patent, thereby obtaining a plurality of ratios, each ratio of the plurality of ratios corresponding to a different said each word;
   comparing each ratio of the plurality of ratios to a first predetermined parameter to obtain a plurality of key terms, a key term being a word of the plurality of words corresponding to a ratio of the plurality of ratios that exceeds the first predetermined parameter.

38. The article of manufacture of claim 37, wherein the code further causes the processor to perform the step of organizing the search results according to a criterion of relevance to the patent.

39. The article of manufacture of claim 37, wherein the code further causes the processor to perform the step of generating a claim chart after the step of identifying one or more key terms.

40. The article of manufacture of claim 37, wherein the code further causes the processor to perform the step of selecting synonyms of the key terms, and wherein the code causes the processor, in the course performing the step of formulating at least one query, to perform the step of formulating a first query to search for data items that include the key terms of the one or more limitations of the first independent claim and the synonyms of the key terms.

41. The article of manufacture of claim 37, wherein the code further causes the processor to perform the following steps:

selecting synonyms of the key terms; and
   translating the key terms and the synonyms from language of the patent into a first foreign language, to obtain translated key terms in the first foreign language;
   wherein the code causes the processor, in the course of performing the step of formulating at least one query, to perform the step of formulating a first query in the language of the patent to search for data items that include the key terms of the one or more limitations of the first independent claim and the synonyms of the key terms, and the step of formulating a second query in the first foreign language to search for data items that include the key terms of the one or more limitations of the first independent claim and the synonyms of the key terms in the first foreign language, the second query being equivalent to the first query.

42. The article of manufacture of claim 41, wherein the code causes the processor, in the course of performing the step of formulating at least one query, to perform the step of formulating a plurality of queries.

43. The article of manufacture of claim 42, wherein the code further causes the processor to perform the step of organizing the search results according to a criterion of relevance to the patent.

44. The article of manufacture of claim 42, wherein the code causes the processor, in the course of performing the step of launching the at least one query, to perform the step of parallel launching of the plurality of queries.

45. The article of manufacture of claim 41, wherein the code further causes the processor to perform the following steps:

determining a number of distinct search results;
   comparing the number of distinct search results to a limit of quantity of search results before the step of reviewing results; and
   repeating the steps of formulating at least one query, launching the at least one query, and receiving search results before the step of reviewing the search results if the number of distinct search results exceeds the limit of quantity of search results.

46. The article of manufacture of claim 45, wherein the code further causes the processor to perform the step of organizing the search results according to a criterion of relevance to the patent.

47. The article of manufacture of claim 37, wherein the code further causes the processor to perform the step of eliminating multiple instances of same search result after receiving the search results.

48. The article of manufacture of claim 37, wherein the code causes the processor, in the course of performing the step of formulating at least one query, to perform the step of formulating a plurality of queries.

* * * * *